No. 667,485. Patented Feb. 5, 1901.
J. C. BEAN.
NON-PUNCTURABLE TIRE.
(Application filed Apr. 21, 1900.)

(No Model.)

Witnesses
Frank W. Richards.
Frank L. Whitcomb

Inventor
John C. Bean,
By his Attorney
Thos. William Hobday.

THE NORRIS PETERS CO., PHOTO-LITHO., WASHINGTON, D. C.

United States Patent Office.

JOHN CARROLL BEAN, OF BOSTON, MASSACHUSETTS.

NON-PUNCTURABLE TIRE.

SPECIFICATION forming part of Letters Patent No. 667,485, dated February 5, 1901.

Application filed April 21, 1900. Serial No. 13,805. (No model.)

*To all whom it may concern:*

Be it known that I, JOHN CARROLL BEAN, of Boston, in the county of Suffolk, State of Massachusetts, have invented a new and efficient Non-Puncturable Tire, of which the following is a specification.

The object of my invention is to attain a pneumatic tire capable of preventing anything cutting through so as to puncture the tire, which I accomplish in the following manner.

Figure 1:
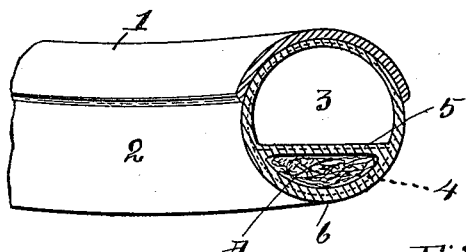
Figure 2:
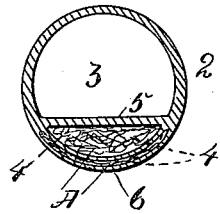
Figure 3:
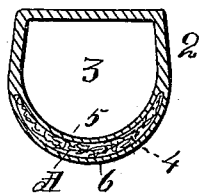
Figure 4:
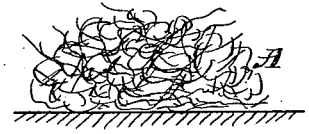
Figure 5:
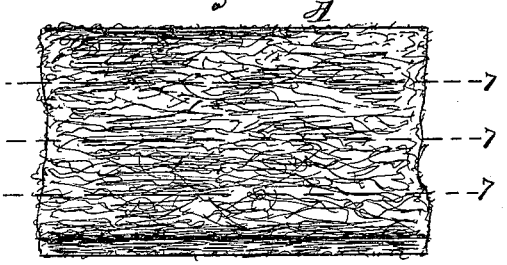
Figure 6:
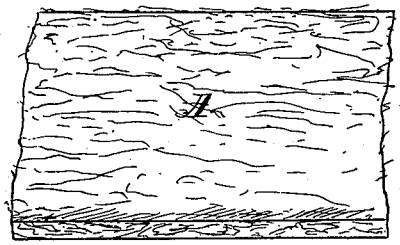

Figure 1 is a transverse section showing my invention. Figs. 2 and 3 are modifications of Fig. 1. Fig. 4 is a view representing the condition of the material in its commercial state by which the object of my invention is attained. Fig. 5 is a view illustrating the aforesaid material treated and manipulated in condition to be used in the construction of the tire. Fig. 6 is a modification of Fig. 5.

1 represents the rim of the wheel, and 2 the pneumatic tire, which is provided with the air-chamber 3 and the annular pocket 4 between the air-chamber and the tread portion of the tire.

5 denotes the annular partition that establishes the above-mentioned air-chamber and pocket.

6 represents the tread portion of the tire.

A denotes a material the commercial name of which is "steel wool." This material consists of fine steel threads, as represented by Fig. 4, which is treated and manipulated in such a manner as to be closely meshed, intertwined, woven, or yieldably consolidated, as represented by Fig. 5, which shows that when so treated or manipulated it may be made in lengths and that such lengths or strips may be of such width as to permit of being cut into strips of any desired width, as represented by the dotted lines 7. In the pocket 4 is solidly packed the steel material A, which in effect produces a steel-tread tire portion, while at the same time it is light, springy, and resilient.

The steel material may be compounded with wool or rubber composition, which is represented by Fig. 6, or any other suitable material.

Fig. 2 illustrates that a strip of the steel-wool fabric or material may be inserted within the rubber tread portion of the tire besides the pocket of the tire before mentioned containing the steel material, and Fig. 3 shows another way the tire may be made to contain the steel material.

In the manufacture of pneumatic tires it has been and is the aim to attain a pneumatic tire that in its construction will prevent puncturing—that is to say, will prevent anything cutting into the tire, so as to permit the compressed air within to escape and make the tire useless.

By making the tire so as to receive the steel-wool fabric or material in that part of the tire between the air-chamber and the tread portion of the tire, as illustrated in the drawings, the air-chamber is efficiently guarded from any sharp cutting thing that the tire might pass over, in this that such cutting thing will cut the rubber of the tread of the tire, but when it contacts the steel-wool material it comes against a cushion that it cannot cut, but will yield and resist a cutting and penetration, and when the wheel has traveled so as to not contact the ground at that point in its circumference where the (for instance) piece of glass was the tire immediately resumes its normal position and would eject the cutting thing therefrom, and in the case of a pin or tack such is prevented from penetrating the steel-wool material whether it is ejected or not.

Having described my invention, I claim—

A pneumatic tire, comprising an air-chamber, and steel-wool material positioned in the tire between the air-chamber and the outer tread portion of the tire, substantially as and for the purpose described.

In testimony whereof I have hereunto set my hand to this application this 19th day of April, A. D. 1900.

JOHN CARROLL BEAN.

Witnesses:
 THOS. WILLIAM HOBDAY,
 FRANK W. RICHARDS.